United States Patent Office 2,847,758
Patented Aug. 19, 1958

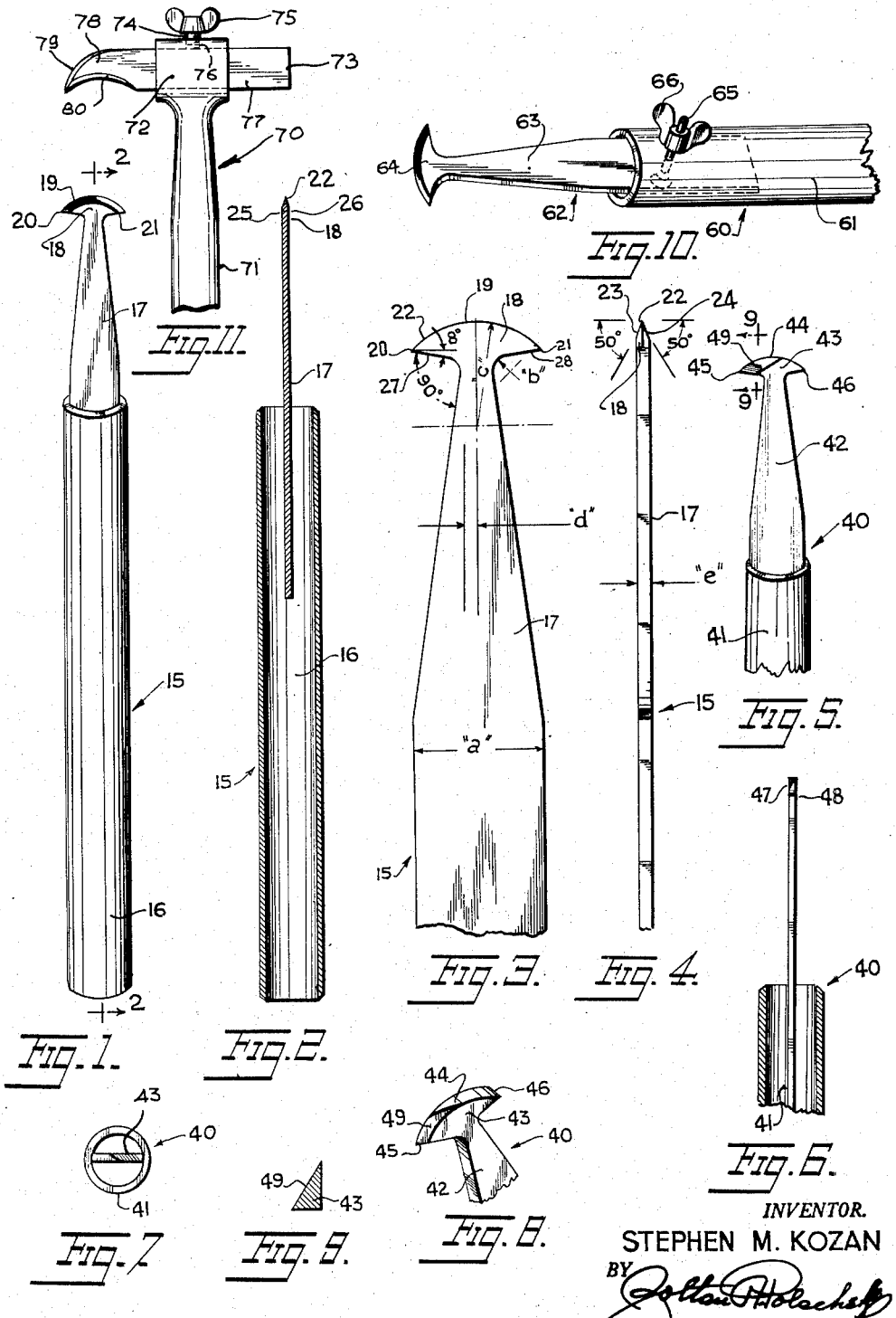

2,847,758

CUTTING DEVICE

Stephen M. Kozan, Astoria, N. Y.

Application March 14, 1957, Serial No. 646,145

2 Claims. (Cl. 30—164.9)

This invention relates to new and useful improvements in cutting tools or devices.

More particularly, the present invention proposes the construction of an improved cutting tool for formica and the like, such material being generally of plastic and with hard flat surfaces used in the construction of counter tops, desk tops, and other work and ornamental surfaces.

As a further object, the invention proposes forming the cutting device as a hand tool with a handle, shank and blade, removably or permanently attached to or integral with the handle and shank, which tool can be used to make a cut or groove in the formica or like material so that the material will break along such cut or line.

Still further, the present invention proposes constructing the tool with a pair of spaced acute angle end point tips and an arcuate cutting edge extending between the tips generally crosswise of the handle and shank of the tool.

A further object according to a modification is to provide such a tool with an arcuate cutting edge extending on one side of the shank of the tool.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of a cutting tool constructed and arranged in accordance with the invention.

Fig. 2 is a sectional view taken on line 2—2 of Fig. 1.

Fig. 3 is an enlarged fragmentary view of the structure shown in Figs. 1 and 2.

Fig. 4 is a side or edge view of the structure shown in Fig. 3.

Fig. 5 is a fragmentary view similar to Fig. 1 but illustrating a modification of the invention.

Fig. 6 is a side or edge view of the structure shown in Fig. 5 but with parts broken away.

Fig. 7 is a top plan view of the structure shown in Figs. 5 and 6.

Fig. 8 is a fragmentary perspective view of the structure shown in Figs. 5, 6 and 7.

Fig. 9 is a sectional view taken on line 9—9 of Fig. 5.

Fig. 10 is a fragmentary perspective view similar to Fig. 5 but illustrating another modification of the invention.

Fig. 11 is a fragmentary side elevational view of a further modification of the invention.

Referring more particularly to the drawings, the cutting tool in accordance with the first form of the invention shown in Figs. 1 to 4, inclusive, is designated generally by the reference numeral 15.

Tool 15 has a handle 16, a shank 17 and an arcuate cutting head 18 all axially aligned for a straight tool. While the head and shank are shown integral but separate from the handle and fixed in the handle, the head, shank and handle may be made in one piece and as part of one operation.

Cutting head 18 has a convexly curved outer end 19 extending crosswise of the shank with acute angle end points tops 20 and 21 at its lateral extremities. A cutting edge 22, consisting of two incline planes 23 and 24 inclined each at an angle of fifty degrees and converging, extends between the two tips 20 and 21 along the curved outer end 19 of the cutting head.

The cutting head 18 has flat front and back faces or sides 25 and 26 and the two tips 20 and 21 have under edges 27 and 28, respectively, which extend to the shank.

Shank 17 is tapered from the head to the handle. The under edges 27 and 28 are inclined from the tips 20 and 21 toward the shank each at an angle of eight degrees from a plane perpendicular to the longitudinal axis of the tool as is shown in Fig. 3. The under edges 27 and 28 are also at right angles to the tapered shank.

In one working embodiment of the invention the cutting tool has been made with the dimension "a," (Fig. 3) 9/16"; radius "b," 1/16"; radius "c," 7/16"; dimension "d," 1/16"; dimension "e," (Fig. 4) 1/16" and with the other angles as indicated above. The tool has proven to be of exceptional use in cutting formica and similar material. A sheet of such material can be cut with either tip of the tool and readily broken along the cut.

The modification of the invention illustrated in Figs. 5 to 9, inclusive, is characterized by the provision of a cutting tool 40 having a handle 41, shank 42 and cutting head 43 all constructed and arranged similarly to the tool 15 except for the cutting head.

Cutting head 43 has a convexly curved outer end 44 extending crosswise of the shank 42 and terminating in two acute angle end point tips 45 and 46. The head 43 has flat sides 47 and 48 and a cutting blade 49 is provided at tip 45. The cutting edge or blade 49 is a single inclined plane extending from the flat side 47 at an angle of fifty degrees and running back only a short distance on the curved outer end 44 of the cutting head.

The modification of the invention illustrated in Fig. 10 is characterized by the provision of a cutting tool 60 having a handle 61, and a blade 62 consisting of shank 63 and cutting head 64, the blade 62 being removably attached to the handle by a screw 65 with wing nut 66.

The modified form of tool 70 shown in Fig. 11 is characterized by a handle 71 having a tubular socketed head portion 72 with the opening therein extending crosswise of the handle. A removable blade 73 is slidably and adjustably supported in the socketed head crosswise of the handle and is removably held in adjusted position by a setscrew 74 and wing nut 75, the screw extending through a screw-threaded opening 76 in the head and engaging the shank 77 of the blade. The blade is formed with a curved cutting head 78 at one end, the cutting head having top and bottom cutting edges 79 and 80, respectively, as viewed in Fig. 11.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A cutting tool for formica and the like comprising a handle, a shank and an arcuate cutting head axially aligned with the handle and shank, said cutting head having a convexly curved outer end extending crosswise of the shank with acute angle end point tips and a cutting edge on the cutting head extending from one of said tips along the convexly curved outer end of the cutting head in the plane of the longitudinal axis of the tool to a point substantially midway the tips, said cutting head having flat sides and said cutting edge being an inclined plane extending from one of the flat sides of the cutting head, at an angle of substantially fifty degrees thereto.

2. A cutting tool for formica and the like comprising a handle, a shank and an arcuate cutting head axially aligned with the handle and shank, said cutting head having a convexly curved outer end extending crosswise of the shank with acute angle end point tips and a cutting edge on the cutting head extending from one of said tips along the convexly curved outer end of the cutting head in the plane of the longitudinal axis of the tool to a point substantially midway the tips, said cutting head having flat sides and a flat transverse peripheral surface, said cutting edge constituting an inclined plane extending from a point below the top edge of one of the flat sides of the cutting head to the top edge of the opposite flat side of the cutting head, said inclined plane being disposed at an angle of substantially fifty degrees to said one of the flat sides.

References Cited in the file of this patent

UNITED STATES PATENTS

| | | |
|---|---|---|
| 870,678 | Henson | Nov. 12, 1907 |
| 1,855,975 | Lamb | Apr. 26, 1932 |
| 2,297,684 | Bratcher et al. | Oct. 6, 1942 |
| 2,743,519 | Hazelton | May 1, 1956 |